(12) United States Patent
Meier

(10) Patent No.: US 10,321,760 B2
(45) Date of Patent: Jun. 18, 2019

(54) FULL PULL-OUT GUIDE FOR FURNITURE PARTS

(71) Applicant: REME-Moebelbeschlaege GmbH, Hoevelhof (DE)

(72) Inventor: Bruno Meier, Hoevelhof (DE)

(73) Assignee: REME-Moebelbeschlaege GmbH, Hoevelhof (DE)

( * ) Notice: Subject to any disclaimer, the term of this patent is extended or adjusted under 35 U.S.C. 154(b) by 0 days.

(21) Appl. No.: 15/755,192

(22) PCT Filed: Jul. 13, 2016

(86) PCT No.: PCT/DE2016/100310
§ 371 (c)(1),
(2) Date: Feb. 26, 2018

(87) PCT Pub. No.: WO2017/036440
PCT Pub. Date: Mar. 9, 2017

(65) Prior Publication Data
US 2018/0242737 A1   Aug. 30, 2018

(30) Foreign Application Priority Data

Sep. 3, 2015   (DE) .................... 20 2015 104 668 U

(51) Int. Cl.
*A47B 88/493*   (2017.01)
*F16C 29/04*   (2006.01)
(Continued)

(52) U.S. Cl.
CPC .......... *A47B 88/493* (2017.01); *A47B 88/487* (2017.01); *F16C 29/005* (2013.01);
(Continued)

(58) Field of Classification Search
CPC ...... F16C 29/04; F16C 29/005; F16C 29/048; F16C 2314/70; A47B 88/40;
(Continued)

(56) References Cited

U.S. PATENT DOCUMENTS 2,675,277 A * 4/1954 McClellan ........... A47B 88/493
296/37.8
3,451,730 A * 6/1969 Thomas ............... A47B 88/493
384/18
(Continued)

FOREIGN PATENT DOCUMENTS

CN   200994581 Y   12/2007
CN   201127426 Y   10/2008
(Continued)

OTHER PUBLICATIONS

International Search Report dated Dec. 6, 2016, in International Application No. PCT/DE2016/100310.
(Continued)

*Primary Examiner* — Marcus Charles
(74) *Attorney, Agent, or Firm* — Stephan A. Pendorf; Patent Central LLC

(57) ABSTRACT

A full pull-out guide for furniture parts, in particular for drawers, with a lower structural height, and including a body rail that can be attached to a stationary furniture part, a running rail that can be attached to a movable furniture part, a middle rail, an inner running path arranged between the body rail and the middle rail, on which a plurality of first force-transferring elements are movably arranged, and an outer running path arranged between the middle rail and the running rail, on which a plurality of second force-transferring elements are arranged. Due to the horizontal displacement of the outer first force-transferring element, the structural height of the full pull-out direction can be reduced. Furthermore, the horizontal displacement of the outer first
(Continued)

force-transferring element in relation to other force-transferring elements has the effect that the contact surface to the rails exists in different vertical planes.

14 Claims, 1 Drawing Sheet

(51) Int. Cl.
*F16C 29/00* (2006.01)
*A47B 88/487* (2017.01)

(52) U.S. Cl.
CPC .... *F16C 29/048* (2013.01); *A47B 2210/0032* (2013.01); *A47B 2210/0059* (2013.01); *F16C 2314/72* (2013.01)

(58) Field of Classification Search
CPC .......... A47B 88/487; A47B 2210/0032; A47B 2210/0051; A47B 2210/0056; A47B 2210/0059; A47B 88/493
USPC ........ 384/18, 19, 49, 55; 312/334.1, 334.11, 312/334.17; 248/430
See application file for complete search history.

(56) References Cited

U.S. PATENT DOCUMENTS

| | | | | |
|---|---|---|---|---|
| 4,569,563 A * | 2/1986 | Fourrey | ............... | B60N 2/0715 296/65.14 |
| 6,347,849 B1 * | 2/2002 | Muterthies | ........... | A47B 88/487 312/334.1 |
| 6,378,968 B1 * | 4/2002 | Weng | ................... | A47B 88/493 312/334.11 |
| 6,427,962 B1 * | 8/2002 | Rohee | .................. | B60N 2/0705 248/424 |
| 6,676,099 B2 * | 1/2004 | Mallard | ................. | B60N 2/0705 248/429 |
| 7,748,801 B2 * | 7/2010 | Prenter | ................ | A47B 88/493 312/334.16 |
| 7,866,772 B1 * | 1/2011 | Chen | .................... | A47B 88/493 312/334.13 |
| 8,079,759 B2 * | 12/2011 | Rohee | ................. | B60N 2/0705 248/430 |
| 9,894,993 B2 * | 2/2018 | Chen | ....................... | F16C 29/04 |
| 2011/0279212 A1 | 11/2011 | Ikriannikov et al. | | |
| 2015/0070124 A1 | 3/2015 | Kapoor et al. | | |
| 2015/0342348 A1 * | 12/2015 | Rioja Calvo | ......... | A47B 88/10 312/334.45 |
| 2016/0249738 A1 * | 9/2016 | Brock | .................. | A47B 88/493 384/18 |

FOREIGN PATENT DOCUMENTS

| | | | | |
|---|---|---|---|---|
| CN | 102283520 A | * | 12/2011 | ............. A47B 88/04 |
| DE | 3921859 A1 | | 1/1991 | |
| DE | 102010036431 A1 | | 1/2012 | |
| DE | 102013111076 A1 | | 4/2015 | |
| EP | 0958761 B1 | | 4/2006 | |
| EP | 2946691 A1 | * | 11/2015 | ............. A47B 88/10 |
| FR | 2620318 A1 | * | 3/1989 | .......... B42F 15/0094 |

OTHER PUBLICATIONS

German Search Report dated Jun. 14, 2016, in German Application No. 20 2015 104 668.5.

* cited by examiner

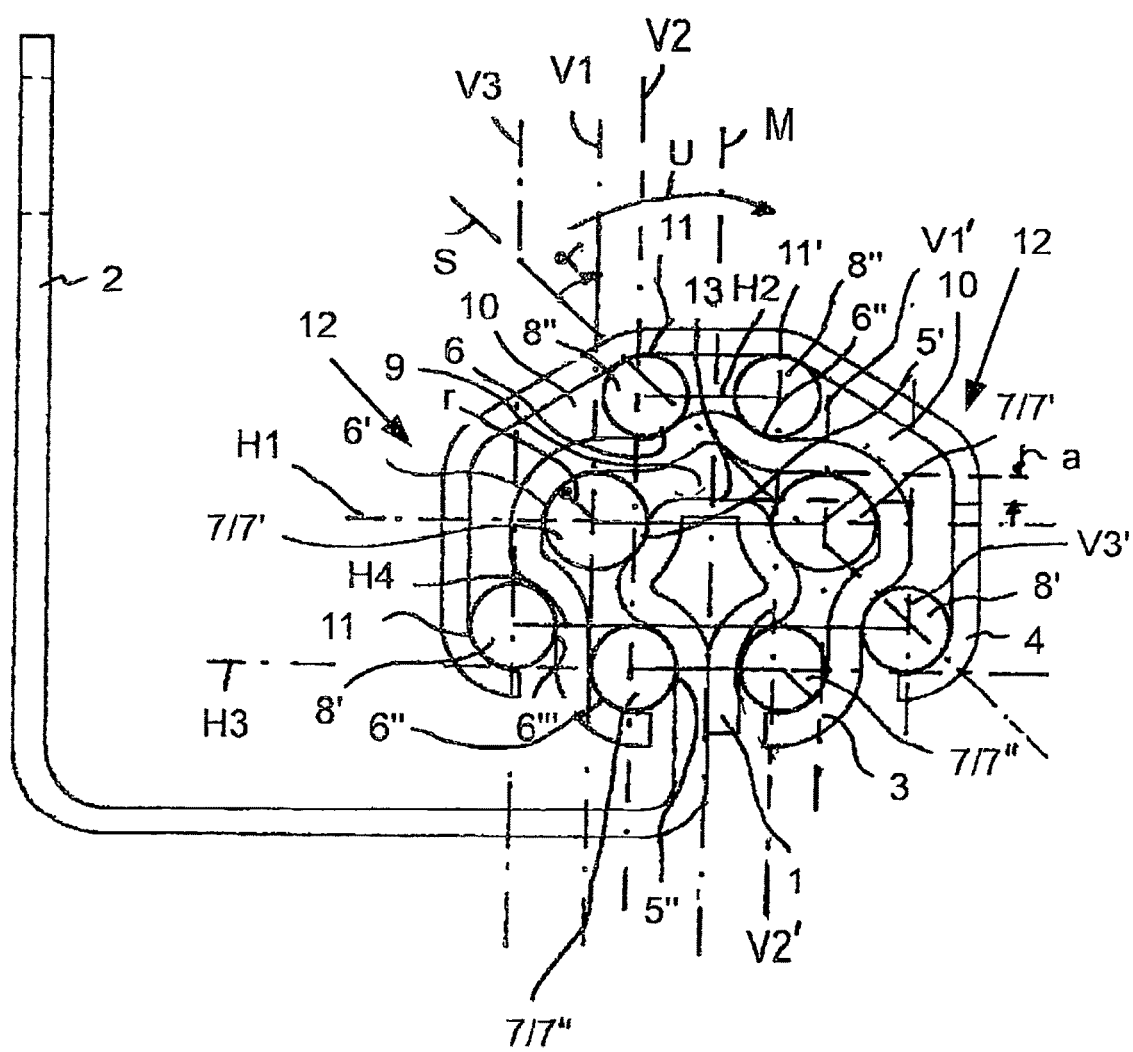

FULL PULL-OUT GUIDE FOR FURNITURE PARTS

BACKGROUND OF THE INVENTION

Field of the Invention

The invention relates to a full pull-out guide for furniture parts, in particular for drawers, with a body rail that can be attached to a stationary furniture part, with a running rail that can be attached to a movable furniture part, with a middle rail, with an inner running path arranged between the body rail and the middle rail, on which a plurality of first force-transferring elements are movably arranged, with an outer running path arranged between the middle rail and the running rail, on which a plurality of second force-transferring elements are arranged.

Description of the Related Art

A full pull-out guide for furniture parts is known from EP 0 958 761 B1, which features a rail that can be attached to a stationary furniture part, a running rail that can be attached to a movable furniture part and a middle rail arranged between the body rail and the running rail. Ball-shaped roller bodies of an equal size are provided as force-transferring elements, which are arranged between the body rail and the middle rail on the one hand, and the middle rail and the running rail on the other. The known full pull-out guide features a relative large structural height, since the running rail is essentially arranged above the body rail. The ball-shaped roller bodies extend over two vertical planes.

A further full pull-out guide is known from DE 10 2010 036 431 A1. The full pull-out guide features a double T-shaped middle rail in profile, on the opposite end sections of which a running rail and a body rail are arranged. This full pull-out guide therefore has a relatively high structure.

A full pull-out guide for furniture parts is known from DE 10 2013 111 076 A1, which features a body rail, a middle rail with a C-shaped profile and a running rail with a C-shaped profile. As force-transferring elements, roller bodies which are rotatable around a single axis are provided in an inner running rail which extends in an extension direction of the full pull-out guide between the body rail and the middle rail, and in an outer running rail, which extends in an extension direction between the middle rail and the running rail. These roller bodies can be designed as cylindrical or barrel-shaped roller bodies, which in all cases come into contact with the corresponding rails along a line.

Due to the selected design of the roller bodies, the mechanical load in particular of the full pull-out guide can be increased. However, these roller bodies, which have the same diameter, lead to a relatively large structure of the full pull-out guide due to their arrangement between the rails. The object of the present invention is therefore to further develop a full pull-out guide so that mechanical stability with a lower structural height is guaranteed in a simple manner.

BRIEF SUMMARY OF THE INVENTION

In order to attain this object, the invention is characterized in that on at least one side of a vertical middle plane of the full pull-out guide an outer first force-transferring element is arranged in a vertical middle plane, which extends between a vertical middle plane of an inner first force-transferring element, which is arranged on the same side of the vertical middle plane as the outer first force-transferring element and/or on one of an inner second force-transferring element, which is arranged on the same side of the vertical middle plane as the outer first force-transferring element on the one hand, and a vertical middle plane of an outer second force-transferring element, which is arranged on the same side of the vertical middle plane as the outer first force-transferring element on the other hand.

According to the invention, a plurality of force-transferring elements is in contact on two rails, namely on a running rail and on a middle rail, wherein an outer first force-transferring element arranged on one side of a vertical middle plane of the full pull-out guide, which extends in an inner running path which is restricted by the middle rail and by a body rail, is arranged with a vertical middle plane of the same between vertical middle planes of other force-transferring elements, wherein the other force-transferring elements are arranged in a restricted manner on the one hand in the inner running path and on the other in an outer running path restricted by the running rail and the middle rail. Due to the horizontal displacement of the outer first force-transferring element, the structural height of the full pull-out direction can be reduced. Furthermore, the horizontal displacement of the outer first force-transferring element in relation to other force-transferring elements has the effect that the contact surface to the rails exists in different vertical planes.

According to a preferred embodiment of the invention, the first force-transferring elements arranged in the inner running path and the second force-transferring elements arranged in the second running path are arranged in pairs, wherein the force-transferring elements of each pair are arranged symmetrically to the vertical middle plane. In this way, a symmetrical force introduction from the running rail in the direction of the body is guaranteed.

According to a further development of the invention, the outer first force-transferring element is arranged in an area protruding at the side of the first running path or middle rail. Preferably, the middle rail extends in this are protruding at the side up to a vertical middle plane of an outer second force-transferring element, which extends in the outer running path. As a result, the distance between the middle rail and the body rail can be advantageously reduced to a considerable degree.

The outer first force-transferring elements can absorb both a vertical force introduction and a side force introduction. To support the vertical force absorption, the inner second force-transferring elements are preferably provided, which, compared to the outer first force-transferring element, continue to be oriented towards the vertical middle axis of the full pull-out guide.

According to a further development of the invention, the force-transferring elements are arranged eccentrically in such a manner that they do not cut the vertical central plane of the full pull-out guide. The force-transferring elements are preferably arranged in more than two vertical planes per side of the full pull-out guide, so that a homogenous force introduction is guaranteed in the circumferential direction of the full pull-out guide.

According to a further development of the invention, the body, middle and running rail are profiled in such a manner that at least in relation to one side of the full pull-out guide, the first force-transferring elements arranged in the inner running path and the second force-transferring elements arranged in the outer running path are arranged in alternation in the circumferential direction of the full pull-out guide. In this manner, at least the middle rail runs in waves in the circumferential direction, with recesses arranged in succession in the circumferential direction on different sides, in which the force-transferring elements are arranged. Advantageously, this leads to an even distribution of force-transferring elements in the circumferential direction. Advantageously, the full pull-out guide has a compact structure as a result.

According to a further development of the invention, the force-transferring elements are arranged in the inner running path and in the outer running path in a different vertical plane and/or horizontal plane in relation to each other. In this manner, an improved homogeneous distribution of the force-transferring elements in the circumferential direction is guaranteed.

According to a further development of the invention, the middle rail and/or the body rail are profiled in such a manner that a horizontal middle plane of the outer force-transferring element is arranged vertically offset downwards in relation to an upper side of the body rail so that a minimal vertical distance between the body rail and the middle rail is less than 1.5 mm. As a result of this side outer displacement of the outer first force-transferring element, the vertical distance can be considerably reduced.

According to a further embodiment of the invention, the outer first force-transferring element is larger than the other first force-transferring elements and second force-transferring elements. As a result, the force absorption, in particular the vertical force absorption between the middle rail and the body rail can be increased.

According to a further embodiment of the invention, the force-transferring elements are designed as ball-shaped roller bodies. The ball-shaped roller bodies only form a punctiform contact area to the surface of the rails. Due to the movability of the ball-shaped roller bodies in the circumferential direction of the full pull-out guide, existing dimensional tolerances between the rails can be offset.

Further advantages of the invention emerge from the further subclaims.

BRIEF DESCRIPTION OF THE SEVERAL VIEWS OF THE DRAWINGS

An exemplary embodiment of the invention will now be explained in greater detail below with reference to the drawings, in which:

FIGURE shows a vertical profile through a full pull-out guide.

DETAILED DESCRIPTION OF THE INVENTION

A full pull-out guide for furniture parts according to the invention is preferably used for drawers as movable furniture parts, so that the drawer is movable or displaceable in a horizontal running direction relative to a stationary furniture part. A furniture body serves as a stationary furniture part, for example, which is integrated in a clothes cupboard. The furniture body can also be formed by a container or a commode or similar.

The full pull-out guide essentially features a body rail 1 which is firmly connected via a free arm section 2 with the stationary furniture part. Further, the full pull-out guide preferably features a middle rail 3 with a C-shaped profile and a running rail 4 with a C-shaped profile. The running rail 4 is firmly connected to the movable furniture part, not shown, for example with the drawer. The middle rail 3 is arranged between the body rail 1 and the running rail 4. Openings in the middle rail 3 and the running rail 4 are arranged on a lower side of the same.

The body rail 1, the middle rail 3 and the running rail 4 are profiled, wherein in particular, the body rail 1 and the middle rail 3 feature recesses 5 and 6 for holding first force-transferring elements 7 and second force-transferring elements 8 which are formed as ball-shaped roller bodies. The first force-transferring elements (referred to below as the first roller bodies 7) are arranged in an inner running path 9, which is restricted by the body rail 1 and the middle rail 3.

The second force-transferring elements (referred to below as the second roller bodies 8) are arranged in an outer running path 10, which is restricted by the middle rail 3 and the running rail 4. In this manner, an availability of the running rail 4 relative to the middle rail 3 and the body rail 1 on the one hand, and of the middle rail 3 relative to the body rail 1 and the running rail 4 on the other, is guaranteed. The inner running rail 9 and the outer running rail 10 extend in the pull-out direction or running direction of the rails 1, 3 and 4.

The first roller bodies 7 and the second roller bodies 8 are respectively arranged in pairs, wherein the roller bodies 7, 8 of each pair of roller bodies 7, 8 run symmetrically to a vertical middle plane M of the full pull-out guide. The body rail 1 is designed as a hollow profile and preferably runs up to the lower side of the full pull-out guide, also symmetrically to the vertical middle plane M. The full pull-out guide is therefore symmetric to the vertical middle plane M.

The first roller bodies 7 arranged in the inner running path 9 are formed by a pair of outer first roller bodies 7' and a pair of inner first roller bodies 7", which are arranged horizontally and vertically offset from each other. The pair of outer first roller bodies 7' is supported in an upper recess 5' of the body rail 1 and in an upper recess 6' of the middle rail 3. The inner first roller body 7" is supported in a lower recess 5" of the body rail 1 and in a lower recess 6" of the middle rail 3. Since the structural parts of the full pull-out guide are symmetrically arranged to the vertical middle plane M of the same, in the FIGURE, for the sake of clarity, only the reference numerals on the left-hand side of the full pull-out guide are drawn in.

In the outer running path 10, a pair of outer second roller bodies 8' and a pair of inner second roller bodies 8" is arranged. The second roller bodies 8' and 8" of the roller body pairs are arranged both horizontally and vertically offset from each other. The inner second roller bodies 8" are supported in a recess 6 of the middle rail 3 and in a recess 11' of the running rail 4. The outer second roller body 8' is supported in a recess 6''' of the middle rail and a recess 11" of the running rail 4.

Since the full pull-out guide is symmetric to the vertical middle plane M, the following applies both to the structural parts arranged on the one side of the vertical middle plane M and to the structural parts which are arranged on an opposite side of the vertical middle plane M. The outer first roller body 7' features a vertical middle plane V1 or V1', which is arranged between a vertical middle plane V2, V2' of the inner first roller body 7" and the inner second roller body 8" on the one hand and a vertical middle plane V3, V3' of the outer second roller body 8' on the other. A horizontal middle plane H1 of the outer first roller body 7' runs offset to horizontal middle planes H3 of the pair of inner first roller bodies 7", a horizontal middle plane H2 of a pair of inner second roller bodies 8" and a horizontal middle plane H4 of a pair of outer second roller bodies 8'.

Both in the inner running path 9 and in the outer running path 10, two pairs of roller bodies 7', 7", 8', 8" respectively are arranged. Inner first roller bodies 7" and inner second roller bodies 8" are arranged facing the vertical middle plane M. Outer first roller bodies 7' and outer second roller bodies 8' face away from the vertical middle plane M or are arranged facing towards a side completion 12 of the full pull-out guide.

The recess 6' of the middle rail 3 forms an area of the inner running path 9 that protrudes to the side. The middle rail 3 extends outwards in this area that protrudes to the side through to the vertical middle plane V3, V3' of the outer second roller body 8'.

In particular, the middle rail 3 is formed as a wave in a circumferential direction U of the same, wherein the recesses 6, 6', 6", 6''' on both sides of the middle rail 3 serve to hold the roller bodies 7', 7", 8', 8". The roller bodies 7', 7", 8', 8" can thus be arranged in the circumferential direction U of the full pull-out guide in alternation in the inner running path 8 and the outer running path 10. This alternating arrangement applies in the present exemplary embodiment to both sides of the vertical middle plane M respectively.

If the pair of inner second roller bodies 8" were to be replaced by a roller body arranged on the vertical middle plane M, or the profile of the middle rail 3 and the running rail 4 were to be adapted accordingly, an alternating arrangement of the roller bodies would extend not only in the semi-circumferential direction U but in the full circumferential direction U from an arm end of the middle rail 3 to another awl end of the same.

The outer first roller body 7' is larger in size than the other roller bodies 7", 8', 8". The horizontal middle plane H1 of this roller body runs below an upper side 13 of the body rail 1. Thus, a minimum vertical distance a between the upper side 13 of the body rail 1 and the middle rail 3 can be less than 1.5 mm. Preferably, the minimum vertical distance a lies in a range of between 0.8 mm and 1.3 mm. In the present exemplary embodiment, the vertical minimum distance a is less than a radius r of the outer first roller body 7'.

A connection line S between the first roller body 7' and the outer second roller body 8' and the inner second roller body 8" runs at an acute angle α to the vertical middle plane M. In the present exemplary embodiment, the included angle α is designed as an acute angle.

The body rail 1, the middle rail 3 and the running rail 4 are designed as profiles consisting of a deformed metal sheet material.

The first roller bodies 7, 7', 7" and the second roller bodies 8, 8', 8" do not cut the vertical middle plane M of the full pull-out guide.

It is self-evident that the embodiment described should not be regarded as a conclusive description of the invention, but merely as an exemplary character for the purpose of presenting the invention.

What is claimed is:

1. A full pull-out guide for a furniture part, with
    body rail (1) that can be attached to a stationary furniture part (1),
    a running rail (4) that can be attached to a movable furniture part, and
    a middle rail (3),
    wherein an inner running path (9) is arranged between the body rail (1) and the middle rail (3), on which a plurality of first force-transferring elements (7, 7', 7") are movably arranged,
    wherein an outer running path (10) is arranged between the middle rail (3) and the running rail (4), on which a plurality of second force-transferring elements (8, 8', 8") are movably arranged,
    wherein on at least one side of a vertical middle plane (M) of the full pull-out guide an outer first force-transferring element (7') is arranged in a vertical middle plane (V1, V2), which extends between a vertical middle plane (V2, V2') of an inner first force-transferring element (7"), which is arranged on at least one of the same side of the vertical middle plane (M) as the outer first force-transferring element (7') and an inner second force-transferring element (8"), which is arranged on the same side of the vertical middle plane (M) as the outer first force-transferring element (7") and a vertical middle plane (V3, V3') of an outer second force-transferring element (8'), which is arranged on the same side of the vertical middle plane (M) as the outer first force-transferring element (7'), and
    wherein the first force-transferring elements (7, 7', 7") and the second force-transferring elements (8, 8', 8") do not cut the vertical middle plane (M) of the full pull-out guide.

2. The full pull-out guide according to claim 1, wherein the first force-transferring elements (7, 7', 7") and the second force-transferring elements (8, 8', 8") are arranged in pairs, wherein the first force-transferring elements (7, 7', 7") and the second force-transferring elements (8, 8', 8") of the pairs are arranged symmetrically to the vertical middle plane (M).

3. The full pull-out guide according to claim 1, wherein the outer first force-transferring element (7') is arranged in an area protruding at the side of the inner running path (9).

4. The full pull-out guide according to claim 1, wherein the first force-transferring elements (7, 7', 7") and the second force-transferring elements (8, 8', 8") do not cut the vertical middle plane (M) of the full pull-out guide.

5. The full pull-out guide according to claim 1, wherein the body rail (1), the middle rail (3) and the running rail (4) are profiled so that the first force-transferring elements (7, 7', 7") arranged on the respective sides in relation to the vertical middle plane (M) of the full pull-out guide and the second force-transferring elements (8, 8', 8") in the circumferential direction (U) of the full pull-out guide are arranged in alternation in the inner running path (9) and the outer running path (10).

6. The full pull-out guide according to claim 1, wherein the first force-transferring elements (7, 7', 7") arranged in the inner running path (9) and the second force-transferring elements (8, 8', 8") arranged in the outer running path (10) are respectively arranged in at least one of a different vertical plane (V1, V', V2, V2', V3, V3') and a horizontal plane (H1, H2, H3, H4) in relation to each other.

7. The full pull-out guide according to claim 1, wherein a horizontal middle plane (H1) of the outer force-transferring element (7') is arranged vertically offset downwards in relation to an upper side (13) of the body rail (1) so that a minimal vertical distance (a) between the body rail (1) and the middle rail (3) is less than 1.5 mm.

8. The full pull-out guide according to claim 1, wherein the outer first force-transferring element (7') is larger than the other force-transferring elements (7", 8', 8").

9. The full pull-out guide according claim 1, wherein the first force-transferring elements (7, 7', 7") and the second force-transferring elements (8, 8', 8") are designed as ball-shaped roller bodies, and the vertical minimal distance (a) between the body rail (1) and the middle rail (3) is less than a radius (r) of the outer first force-transferring element (7').

10. The full pull-out guide according to claim 1, wherein the horizontal middle plane (H1) of the outer first force-transferring element (7') is arranged between a horizontal middle plane (H2) of the inner second force-transferring element (8") and the horizontal middle plane (H3) of the inner first force-transferring element (7") or the horizontal middle plane (H4) of the outer second force-transferring element (8').

11. The full pull-out guide according to claim 1, wherein the body rail (1) and the middle rail (3) and the running rail (4) are designed as a profile consisting of a deformed metal sheet material.

12. The full pull-out guide according to claim 1, wherein the body rail (1) is designed as a hollow profile.

13. The full pull-out guide according to claim 1, wherein the furniture part is a drawer.

14. A full pull-out guide for a furniture part, with
body rail (1) that can be attached to a stationary furniture part (1),
a running rail (4) that can be attached to a movable furniture part, and
a middle rail (3),
wherein an inner running path (9) is arranged between the body rail (1) and the middle rail (3), on which a plurality of first force-transferring elements (7, 7', 7") are movably arranged,
wherein an outer running path (10) is arranged between the middle rail (3) and the running rail (4), on which a plurality of second force-transferring elements (8, 8', 8") are movably arranged,
wherein on at least one side of a vertical middle plane (M) of the full pull-out guide an outer first force-transferring element (7') is arranged in a vertical middle plane (V1, V2), which extends between a vertical middle plane (V2, V2') of an inner first force-transferring element (7"), which is arranged on at least one of the same side of the vertical middle plane (M) as the outer first force-transferring element (7') and an inner second force-transferring element (8"), which is arranged on the same side of the vertical middle plane (M) as the outer first force-transferring element (7") and a vertical middle plane (V3, V3') of an outer second force-transferring element (8'), which is arranged on the same side of the vertical middle plane (M) as the outer first force-transferring element (7'),
wherein the outer first force-transferring element (7'), and the outer second force-transferring element (8'), which are arranged on one side of the vertical central plane (M), with an inner second force-transferring element (8"), which is arranged on the other side of the vertical central plane (M), forms a connection line (8) which includes an acute angle ($\alpha$) to the vertical central plane (M).

* * * * *